United States Patent

[11] 3,624,835

| [72] | Inventor | Philip J. Wyatt<br>Santa Barbara, Calif. |
|------|----------|------------------------------------------|
| [21] | Appl. No. | 777,837 |
| [22] | Filed | Nov. 21, 1968 |
| [45] | Patented | Nov. 30, 1971 |
| [73] | Assignee | Science Spectrum, Inc.<br>Santa Barbara, Calif. |

[54] MICROPARTICLE ANALYZER EMPLOYING A SPHERICAL DETECTOR ARRAY
4 Claims, 2 Drawing Figs.

| [52] | U.S. Cl. | 356/103,<br>250/218, 250/220, 235/92 |
|------|----------|-----------------------------------|
| [51] | Int. Cl. | G01n 21/00 |
| [50] | Field of Search | 356/104,<br>103; 250/218, 220; 235/92 PC |

[56] References Cited
UNITED STATES PATENTS

| 2,920,525 | 1/1960 | Appel et al. | 356/103 |
| 3,358,148 | 12/1967 | Conklin et al. | 356/104 |
| 3,420,609 | 1/1969 | Kozawa | 356/104 |
| 2,816,479 | 12/1957 | Sloan | 250/218 X |
| 3,342,099 | 9/1967 | Kaye | 356/104 X |

Primary Examiner—Ronald L. Wibert
Assistant Examiner—T. Major
Attorneys—James E. Hawes and David Rich ABSTRACT: There is described a method and apparatus for identifying submicroscopic particles by directing the particles through a highly collimated beam of light and simultaneously measuring the light intensity at a plurality of different angles relative to the point where the particles move through the beam.

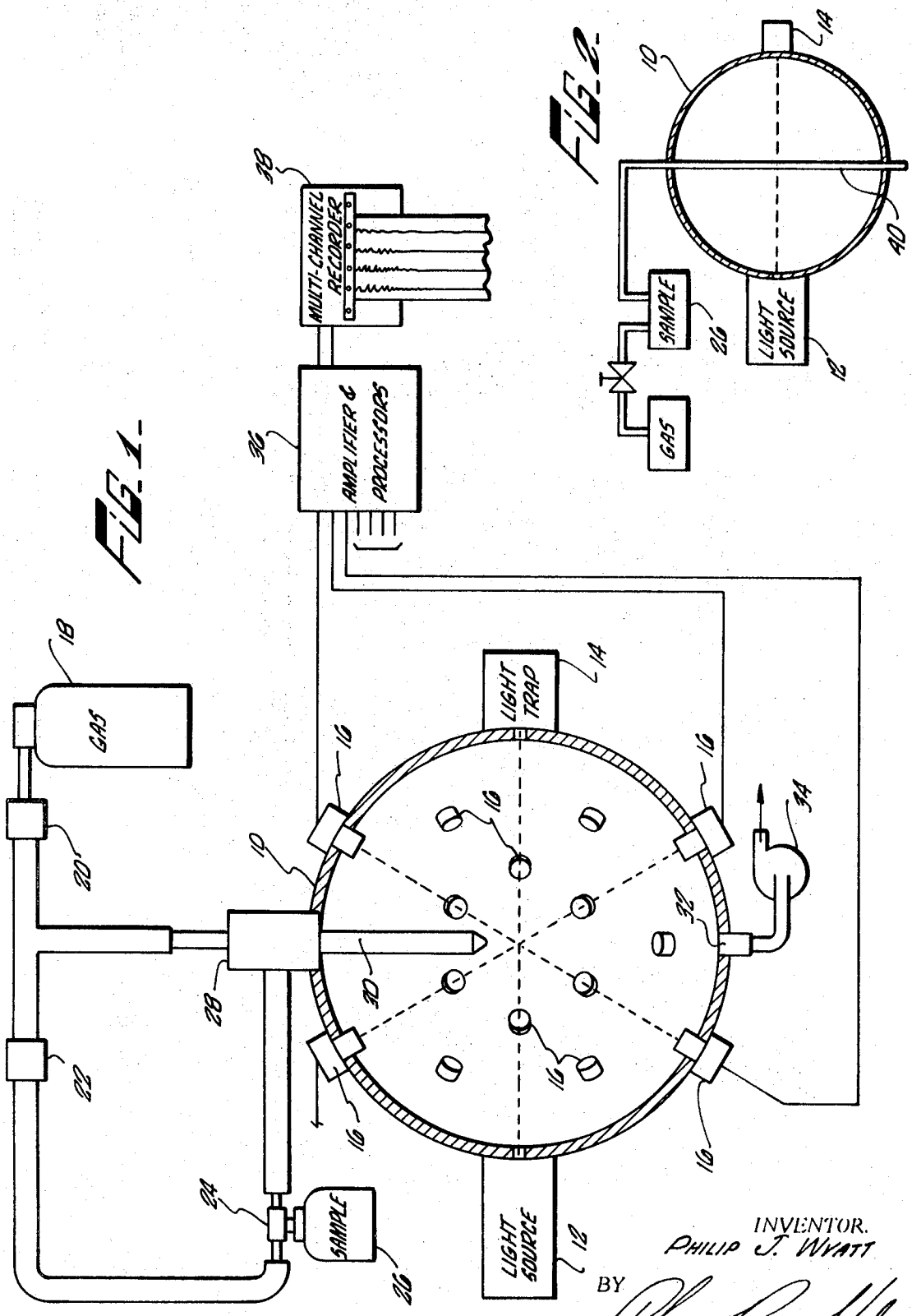

3,624,835

MICROPARTICLE ANALYZER EMPLOYING A SPHERICAL DETECTOR ARRAY

BACKGROUND OF THE INVENTION

This invention relates to the method and apparatus for identifying microparticles, and more particularly, to the identification of microparticles by measurement of the intensity pattern of scattered light.

There has long been a need for analysis and identification of particulate matter such as dust particles, particulate pollutants, spores, micro-organisms, blood cells and other organic cells. Such microparticles typically are of sizes ranging from 0.01 micron up to 100 microns in size. Because of their small size, rapid detection and identification of microparticles represent a difficult problem. Such particles are normally too small to be effectively analyzed by an optical microscope. The electron microscope requires special preparation of the sample and imposes severe environmental limitations which are not suitable for analyzing many types of organic particles, for example. While various optical devices have been developed for utilizing light scattered from the particles to detect the presence of the particle, such known devices are useful only in determining particle densities and yield practically no information as to the qualitative composition of the individual particles being analyzed.

The present invention is directed to a method and apparatus for rapid, quantitative analysis of physical properties of microscopic particulate matter based on the light-scattering properties of the particles being analyzed.

The present invention operates on the principle that the light-scattering properties of a particle are uniquely determined for different types of particles by its physical properties such as its electromagnetic characteristics, shape, and size. In theory, the physical characteristics of a particle should be determinable from information on the light-scattering characteristics of the particle. Thus, by analyzing the radiation scattered from a particle, it is possible to develop much information about the physical characteristics of the particle. However, because of the small size of the particles, it is extremely difficult to isolate and hold a single particle in a manner which permits measurement of the intensities of radiation in sufficient number of different directions to develop an accurate analysis of the particle under study. Moreover, many particles, such as organic micro-organisms, are very sensitive to environmental conditions and may change or deteriorate before an effective analysis can be made.

SUMMARY OF THE INVENTION

The present invention provides a method and apparatus for rapidly analyzing microparticles by measurement of the light-scattering properties of the particles. This is accomplished, in brief, by providing a highly collimated beam of electromagnetic radiation, such as from a laser, directing the microparticles in a stream which intersects the light beam, and detecting the intensity of light scattered by a particle in passing through the light beam by a plurality of detectors positioned at a number of different angles in relation to the point of intersection between the light and the particle stream. The resulting "-pattern" of the outputs of the detectors is uniquely related to the scatterer and yields information by which its characteristics may be determined.

BRIEF DESCRIPTION OF THE DRAWING

For a more complete understanding of the invention, reference should be made to the accompanying drawing, wherein:

FIG. 1 is a partially schematic representation of a preferred embodiment of the invention; and FIG. 2 is a cross-sectional view showing an alternative embodiment of the invention.

DESCRIPTION OF A SPECIFIC EMBODIMENT

Referring to FIG. 1 in detail, the numeral 10 indicates a spherical chamber. The chamber provides a completely enclosed space, permitting a controlled environment from which all external light is excluded and in which the atmosphere can be suitably controlled. A light source 12 is mounted on the outside of the chamber 10 and is arranged to direct a beam of light along one diameter of the interior of the spherical chamber. Light source 12 may be any suitable means for providing a highly collimated beam of electromagnetic radiation. The light source 12 may, for example, be a laser, or might be an arc lamp or incandescent lamp together with narrow band filters and suitable collimating condensers for providing the narrow light beam. A laser may be preferred because it has a high degree of monochromaticity, it generates a highly collimated light beam, and it provides extremely high light intensity. Typically, the beam has a cross-sectional diameter of a millimeter or less. A suitable light trap 14 is positioned diametrically opposite the light for absorbing the energy of the beam and preventing any reflection or scattering of the beam back into the interior space of the chamber.

Mounted in the wall of the chamber 10 are a plurality of light detectors 16. The detectors are directed toward the center of the spherical chamber and are mounted at equal radial distances from that point. The detectors preferably are collimated photomultipliers which have very high sensitivity and a broad dynamic operating range. However, other types of radiation detectors, such as photodiodes, phototransistors, bolometers and the like, and modifications of such devices could be used. Detectors should each subtend a small solid angle and are spaced about the circumference of the chamber.

The sample particles being analyzed are introduced into the chamber so as to be directed along a diameter of the spherical chamber 10. Thus, the particles pass through the light beam. The particles are preferably injected in a gas stream and are disbursed and spread out sufficiently in the stream so that normally only a single particle is in the beam at a time. One arrangement for injecting the particles, as shown in FIG. 1, includes a source 18 of an inert gas such as nitrogen under pressure. The gas is filtered by a suitable filter 20 and a portion of the gas is directed through a pressure reducer 22 to an atomizer 24. The particulate matter under investigation is preferably disbursed in a highly volatile fluid in a sample container 26 connected to the atomizer 24. As the atomizer sprays the liquid containing the particles out of the atomizer, the liquid evaporates leaving the particles in a highly disbursed state.

From the atomizer, these particles are drawn into an injection chamber 28 to which also is connected the high-pressure gas source 18. The particles are picked up in the injection chamber by the stream of high-pressure gas which flows out of the chamber through a nozzle 30 into the interior of the chamber 10. The nozzle 30 directs the high-velocity stream of gas containing the disbursed particles in a fine stream passing through the beam of light at the center of the sphericular chamber. The stream is directed toward an exhaust opening 32, which is connected to an exhaust pump 34, by means of which the sample particles are continuously withdrawn from the chamber. As each particle passes through the light beam, it scatters the light both by reflection and refraction, as well as diffraction. Scattered radiation is sensed by the light detectors 16, each detector sensing the scattering event from a different fixed observation angle. Each of the detectors 16 is connected to amplifiers, which may include processing circuitry such as time discriminators and ratiometers, indicated generally at 36, the output of the amplifiers driving a recording device such as a multichannel strip recorder 38. Thus, the output of each detector may be recorded as a separate trace on a multichannel recorder. When taken together, the separate traces at any selected point along the length of the chart indicate the relative intensities of light falling on all of the detectors at some instant of time. From this data, it will be apparent that a plot can be made of the intensity of the scattered radiation as a function of angle at the instant a particular particle is in the light beam.

It will be appreciated that other data analysis techniques may be applied, such as digitizing the analog information derived from the detectors and supplying the digitized data to a computer where it can be compared with data of a number of known samples.

It is desirable for satisfactory operation, that the orientation of the particle not change while it is passing through the light beam. For this reason, fairly high flow rates of the order of one meter per second are desirable. While the total time the particles are exposed to dehydration effects of the gas during the measurement may be quite small, on certain types of particles it may be desirable to maintain them in a liquid medium during the measurement. Such an arrangement is shown in FIG. 2, in which the particles are suspended in a liquid sample and directed through a capillary tube 40 which extends along the diameter of the spherical chamber 10 and intersects the beam from the light source 12. The liquid medium, being more viscous than the gas used in the embodiment of FIG. 1, tends to maintain the particles in alignment even though they pass through the light beam at much slower flow rates.

From the above description, it will be recognized that the present invention provides a method and apparatus for analyzing microparticles based on the intensity distribution of scattered light measured simultaneously at a number of different angles. A large number of readings can be taken in a relatively short time. Sampling rates of the order of a 1,000 particles a second is possible. It will be recognized that while the above description is directed to a preferred embodiment of the invention, many modifications are possible within the scope of the invention as defined by the claims. For example, light sources of different frequencies may be employed, depending upon the size of the particles being analyzed. It has been found that preferably the ratio of the circumference of the particle to the wavelength of the light should lie in the range between one and 10. If the ratio is much less than one, there is considerable loss in detail in the scattering pattern. On the other hand, if the ratio is much greater than 10, the differential scattered intensity pattern becomes extremely complex, greatly complicating the identity analysis. An additional analysis tool is provided by polarizing the light source and/or the detectors since the scattering properties of some particles is affected by a polarization of the light. Also it will be appreciated that the light source can be pulsed to reduce the average power and provide pulsed outputs from the detectors, permitting AC amplification.

While normally it is preferably that a single particle pass through the light beam at a time, where the particles are symmetrical in shape, they may be examined in groups and still provide a characteristic scattering pattern.

What is claimed is:

1. A microparticle analyzer including means for generating a collimated beam of radiant energy and means to direct said beam into a predetermined location, means for introducing at least one microparticle into the radiant beam at said location, means for simultaneously detecting at a plurality of locations the spherical scattered intensity pattern produced by the microparticle in said beam and for producing an output indicative of the scattered intensity incident at each of said locations, means positioning said detecting means in a spherical surface zone at equal radial distances about said location, said detecting means including a plurality of independent detectors sufficient in number to simultaneously detect the radiant energy acattered by said microparticle in a plurality of planes all of which include the radiant energy beam and further including means for simultaneously registering the output of the plural detectors to derive the spherical radiant energy scattering pattern of said microparticle.

2. A microparticle analyzer as set forth in claim 1 in which the means for introducing at least one microparticle into the radiant energy beam includes means for directing a stream of dispersed microparticles through the beam at substantially the same predetermined location.

3. A microparticle analyzer as set forth in claim 1 in which the plurality of detectors are positioned to substantially envelope at least one hemisphere of the radiant energy scattered by the microparticle, and in which the detectors are sufficient in number to derive a scattering pattern uniquely classifying the scattering microparticle.

4. The method of analyzing microparticles which comprises the steps of introducing a stream of microparticles into a predetermined location, illuminating the microparticles with a collimated beam of radiant energy, simultaneously detecting the intensity of the radiant energy scattered by each of said microparticles over a spherical zone at a plurality of locations that are in a plurality of planes all of which planes include the radiant energy beam, simultaneously registering the intensities of the detected scattered energy for an interval of time to obtain data groups for each microparticle having the variation of the scattered intensities over a spherical range of scattering angles, digitizing said data groups and comparing said data groups with data of a number of known microparticle samples.

* * * * *